United States Patent [19]
Axelrod et al.

[11] Patent Number: 6,159,516
[45] Date of Patent: Dec. 12, 2000

[54] METHOD OF MOLDING EDIBLE STARCH

[75] Inventors: Glen S. Axelrod; Ajay Gajria, both of Neptune City, N.J.

[73] Assignee: TFH Publication, Inc., Neptune City, N.J.

[21] Appl. No.: 09/227,767

[22] Filed: Jan. 8, 1999

[51] Int. Cl.[7] .............................. A23L 1/0522; A23P 1/10
[52] U.S. Cl. ...................... 426/456; 426/512; 426/516; 426/658; 426/661; 426/2
[58] Field of Search ................................. 426/2, 658, 661, 426/635, 623, 456, 512, 516, 517, 805, 808

[56] References Cited

U.S. PATENT DOCUMENTS

| | | | |
|---|---|---|---|
| 2,412,213 | 12/1946 | Groen | 260/234 |
| 2,602,755 | 7/1952 | Silvernail | 106/189 |
| 3,038,895 | 6/1962 | Rutenberg et al. | 260/233.3 |
| 3,074,803 | 1/1963 | McGowan et al. | 106/38.5 |
| 3,089,857 | 5/1963 | Pottenger | 260/2.5 |
| 3,117,014 | 1/1964 | Klug et al. | 106/213 |
| 3,137,592 | 6/1964 | Protzman et al. | 127/32 |
| 3,184,335 | 5/1965 | Germino et al. | 127/71 |
| 3,911,159 | 10/1975 | Heusdens | 426/580 |
| 3,954,104 | 5/1976 | Kraskin et al. | 128/263 |
| 3,956,507 | 5/1976 | Shoaf et al. | 426/96 |
| 4,061,610 | 12/1977 | Glowaky et al. | 260/17.4 |
| 4,076,846 | 2/1978 | Nakatsuka et al. | 426/62 |
| 4,125,495 | 11/1978 | Griffin | 260/17.4 |
| 4,138,013 | 2/1979 | Okajima | 206/528 |
| 4,216,240 | 8/1980 | Shirai et al. | 426/516 |
| 4,218,350 | 8/1980 | Griffin | 260/17.4 |
| 4,232,047 | 11/1980 | Sair et al. | 426/96 |
| 4,415,593 | 11/1983 | Glass et al. | 426/4 |
| 4,673,438 | 6/1987 | Wittwer et al. | 106/126 |
| 4,738,724 | 4/1988 | Wittwer et al. | 106/213 |
| 4,830,866 | 5/1989 | Manser et al. | 426/451 |
| 4,900,361 | 2/1990 | Sachetto et al. | 106/213 |
| 5,200,212 | 4/1993 | Axelrod | 426/2 |
| 5,240,720 | 8/1993 | Axelrod | 426/2 |
| 5,405,564 | 4/1995 | Stepto et al. | 264/115 |
| 5,476,069 | 12/1995 | Axelrod | 119/709 |
| 5,827,565 | 10/1998 | Axelrod | 426/512 X |
| 5,941,197 | 8/1999 | Axelrod | 426/512 X |

FOREIGN PATENT DOCUMENTS

| | | | |
|---|---|---|---|
| 0118240 | 6/1997 | European Pat. Off. | C08L 3/00 |
| 2001533 | 7/1971 | Germany | D01F 3/36 |
| 1592062 | 7/1981 | United Kingdom | C08L 101/00 |
| 2190093 | 11/1987 | United Kingdom | C08L 3/00 |

OTHER PUBLICATIONS

Bastioli, Properties and Applications of Mater–Bi Starch–based Materials, Polymer Degradation and Stability 59 (1998) pp. 263–272.

*Primary Examiner*—Milton Cano
*Attorney, Agent, or Firm*—Hayes, Soloway, Hennessey, Grossman & Hage, P.C.

[57] ABSTRACT

A process for forming starch into a molded article using melt processing techniques which process comprises combining starch and water to form a mixture wherein the water content is in the range of about 20.0 to 40.0% by weight with respect to that of the starch and introducing and heating the mixture in an extruder wherein the water content of the product upon discharge from the extruder is less than the water content of the mixture entering the extruder. The extrudate is then, optionally dried, and introduced to a heated injection molding machine and injection molded and cooled to form a molded article wherein the water content of the molded article is at or below about 20% by weight.

35 Claims, No Drawings

METHOD OF MOLDING EDIBLE STARCH

FIELD OF THE INVENTION

This invention relates to a method of manufacturing edible starch products with specific utility in the form of an edible product for an animal or as a chew toy for a pet. The manufacturing method disclosed herein employs melt mixing of starch with selected amounts of additives, including water and other fillers, followed by injection molding into a selected shape. The processing conditions, including barrel temperatures and cooling profiles, as in the case of extrusion compounding, are also uniquely adjusted along with additive amount and water levels to provide molded starch products with greatly improved performance characteristics.

BACKGROUND OF THE INVENTION

The prior art is replete with disclosures directed at converting starch or related materials into a molded or shaped article. The following discussion therefore provides a brief chronological overview of the development of such technology as it has appeared in the patent literature over the past several decades.

For example, starting with U.S. Pat. No. 2,602,755 (1952) entitled "Thermoplastic Compositions of Water-Soluble Cellulose Ethers" it was disclosed that powdered methyl cellulose of a water soluble variety could be blended with a particular narrow range of mixtures of propylene glycol and glycerin to provide compositions which could be molded or extruded when pressure was applied at temperatures of 150° to 170° C., without decomposition. This was then followed by U.S. Pat. No. 3,137,592 (1961) entitled "Gelatinized Starch Products" which described a method of preparing homogenous gelatinized starch products, which method was characterized by intense mechanical working or shearing of the starch at elevated temperatures and pressures in the presence of a minor-proportion of a starch-swelling agent. The method goes on to disclose the use of a screw-type extruder, along with water as the preferred starch-swelling agent or plasticizer due to its low cost and relatively low boiling point.

Attention is next directed to U.S. Pat. No. 3,038,895 (1962) entitled "Water-Dispersible Partially Substituted Derivatives of Amylose" which describes a means for producing an amylose derivative which was readily dispersed in water without the need to exceed temperatures above 130° C., which dispersion was identified as "viscosity stable", thereby forming films of excellent water resistance. Shortly thereafter, in U.S. Pat. No. 3,074,803 (1963) entitled "Molding Starch Composition" a method was disclosed for preparing molded starch compositions, which method focused on the blending of high melting point fatty acid esters with starch which blends are then said to provide a composition relatively free of oil build-up along with what was said to be a minimum of starch dusting.

This was followed by U.S. Pat. No. 3,117,014 (1964) entitled "Amlaceous Compositions for Shaped Articles and Process" which described starch compositions which are said to flow under heat and pressure which compositions comprise a derivative of amylaceous material, a plasticizer for said derivative, and water, wherein the amount of water is between 1.0–20% by weight. Turning next to U.S. Pat. No. 4,076,846 (1978) entitled "Protein-Starch Binary Molding Composition and Shaped Articles Obtained Therefor" an edible, water-soluble thermoplastic molding composition comprising a starch material is disclosed, along with a neutral inorganic alkali salt of protein material, water, an edible plasticizer, an edible lubricant, and other additives. Such compositions were said to have excellent moldability and processibility when subjected to various common plastics processing techniques, such as compression molding, transfer molding, extrusion molding, blow molding, inflation molding, injection molding, vacuum forming, pressuring forming, heat sealing, etc.

More recent disclosures include U.S. Pat. No. 4,673,438 (1987) entitled "Polymer Compositions and Injection Molding". This disclosure states that capsules and other shaped products can be formed from a starch composition comprising starch, with a molecular mass range of 10,000 to 20,000,000 Daltons, along with a water content from 5–30% by weight. The recited process using an injection molding machine requires that one maintain a starch/water composition at a water content of 5–30% by weight of the composition under controlled conditions of temperature and pressure, heating said starch/water composition at elevated pressure above its glass transition temperature and melting point while maintaining said water content to form a melt, further heating and plasticizing said molten starch/water composition to dissolve the starch in the water to form what is stated to be an essentially molecularly dispersed solution of the melt. This is followed by injecting the starch/water melt into a mold cavity while maintaining a predetermined water content, and cooling the composition in the mold to form a molded product at a temperature below the glass transition temperature of the composition and ejecting the molded product from the mold.

In U.S. Pat. No. 4,738,724 (1988) entitled "Method for Forming Pharmaceutical Capsules from Starch Compositions" injection molded capsules of starch are disclosed, for pharmaceutical applications, which method, similar to the '438 Patent discussed above, recites that one first provide a starch water mixture having a water content in the range of about 5 to 30% by weight based on the weight of starch and water. This is followed by heating the starch/water composition at elevated temperatures above its glass transition temperature and melting point while maintaining the water content to form a melt, followed by further heating and plasticizing said molten starch-water composition to dissolve the starch in the water followed by injection molding of the plasticized starch at elevated temperature and pressure into a mold, and forming a multi-chambered configuration, and ejecting the molded capsule from the mold.

U.S. Pat. No. 5,405,564 (1995) entitled "Method of Forming Shaped Articles Made From Pre-Processed Starch" recites a process of forming shaped articles from starch. The method is described as having surprisingly established that in the process of injection molding starch, there are two important steps that are preferably separated. That is, this disclosure recites that one must first heat a starch/water mixture wherein the water content is about 10% to about 20% by weight with respect to that of said starch, in a closed volume to a temperature within the range of about 120 ° C. to about 190 ° C. at a pressure corresponding to the vapor pressure of water as the used temperature and up to about $150 \times 10^5$ N/m², to form a melt, wherein said melt is extruded and cooled to a solidified and granulated product. This is then followed by heating such solid starch composition, wherein the water content of said solid composition is about 10% to about 20% by weight with respect to that of said starch, in the screw barrel of an injection molding machine or an extruder, at a temperature of from about 80° C. to about 200° C., and at a pressure of from about zero to about $150 \times 10^5$ N/m² for a time long enough to form what is termed as a melt of destructurized starch, transferring said melt of destructurized starch to a mold or extruding said melt of destructurized starch while maintaining the water content in the range of from about 10% to about 20% by weight with respect to that of the composition, and cooling said melt of destructurized starch in said mold or outside said extruder to form a solid shaped article.

Finally, attention is directed to the following U.S. Patents and copending applications, commonly owned by the assignee herein: U.S. Pat. Nos. 5,200,212; 5,240,720; 5,476,069; U.S. patent application Ser. Nos.: 08/923,070 filed Sep. 3, 1997 entitled "Vegetable Based Dog Chew"; U.S. Pat. Nos. 5,827,565; 5,941,197; U.S. patent application Ser. Nos. 08/888,611 filed Jul. 7, 1997 entitled "Vegetable Dog Chew" now abandoned; 09/114,872 filed Jul. 14, 1998 entitled "Heat Modifiable Edible Dog Chew" now abandoned; U.S. Pat. No. 5,086,940; U.S. patent application Ser. Nos. 09/138,804 filed Aug. 21, 1998 entitled "Improved Edible Dog Chew"; 09/116,070 filed Jul. 15, 1998 entitled "Wheat & Casein Dog Chew With Modifiable Texture"; 09/116,555 filed Jul. 15, 1998 entitled "Heat Modifiable Peanut Dog Chew". In addition to such patents and applications, attention is also directed to the art cited in said patents and applications, as such art relates to the field of molded starch products.

As is apparent from the above review of the prior art, a variety of efforts have been developed to convert starch, with minimum degradation, into a molded product of a desired configuration. Such efforts have focused on the use of propylene glycol, fatty acid esters, alkali salts of protein material and/or water as a starch additive, followed by melt processing techniques such as extrusion and/or injection molding. With respect to the use of water, although it has been disclosed that water apparently assists in regulating starch degradation, there has been an intensive and on-going search for some key or optimum water level, which when combined with a corresponding optimum processing profile, fully prevents the starch from overheating and ultimately degrading, and therefore leading to the development of molded products of highest possible quality.

Accordingly, the present invention has as its primary object to formulate a starch composition, followed by a processing/molding profile, which formulation and processing/molding profile affords a molded starch product with mechanical property performance that vastly improves over those starch products reported in the art.

In addition, it is also a primary object of this invention to develop and optimize the additive level for a starch composition such that the starch, subsequent to a desired melt processing technique and conversion into a desired shape, will have optimum and unique properties suitable for the manufacture of an edible starch product and/or chew toy for a pet.

SUMMARY OF THE INVENTION

A process for forming starch into a molded product using melt processing techniques, and the product produced by said process, which process comprises combining starch and water to form a mixture wherein the water content is in the range of about 20.0 to 40.0% by weight with respect to that of said starch, introducing and heating said mixture in an extruder wherein the water content of said product upon discharge from said extruder is less than the water content of said product entering said extruder, and introducing the product of (b) to a heated injection molding machine and injection molding and cooling to form said molded article wherein the water content of said molded article is at or below about 20% by weight.

DETAILED DESCRIPTION OF THE PREFERRED EMBODIMENTS

In accordance with the present invention, a method of manufacturing edible starch products is disclosed, which employs extrusion melt mixing of starch with selected amounts of additives, including water and other fillers, followed by injection molding into a selected shape. Preferably, the products herein have been manufactured in the form of chew toys and other similarly shaped products for pets.

Tables 1–6 herein illustrate the various processing parameters and product characteristics of the various preferred embodiments for manufacturing the shaped products of the present invention. As can be seen in the accompanying tables, preferably, potato starch, or for that matter, any carbohydrate of natural or vegetable origin, composed mainly of amylose and/or amylopectin, can be used in accordance with the present invention. It may be extracted from various plants, such as potatoes, rice, tapioca, corn and cereals such as rye, oats and wheat. Particularly preferred, however, is potato starch and corn starch, flour and mixtures thereof.

The water content of the starch is first set in the range of about 20–40% by weight with respect to that of the starch, which mixture is preferably achieved by mixing the starch with water in a Wenger DDC Preconditioner that provides controlled pre-moisturization and complete mixing of the water with the starch material. This is then followed by placement of the starch/water combination into an extruder, and in that regard, preferably, a Wenger TX Magnum Extruder is employed, available from the Wenger Company. While twin-screw operation is preferred, single screw extrusion is also an acceptable alternative. The conditions for extrusion, including such variables as extruder shaft speed, control temperatures of the various extruder zones, heat pressure, etc., are all listed in the accompanying tables. Finally, in the context of the present invention, where the water level charged in the extruder is preferably lowered during the course of extrusion, a vented barrel extruder is employed, wherein such venting lowers the water level to a desired level. To facilitate such water level change, it has been found particularly useful to apply a light vacuum to the extruder barrel at the vent port, to thereby provide a more efficient removal of water from the extrudate therein.

As already noted, water levels for the starch/water mixture charged into the extruder begin at about 20–40% by weight, but preferably, water content is best adjusted to the following ranges of water content: 25–35%, 30–35%, and 30–33%. In particularly preferred embodiment, the water level of the starch/water mixture entering the extruder is at about 31.2%, 31.1%, 30.2%. 22.5%, and 25.2% as shown in Examples I–V in the accompanying Tables 1–6. However, in accordance with the present invention, those skilled in the art will recognize that the ranges are only preferred, and other levels of water may be optionally selected within the broad teachings provided herein. The resulting products of extrusion are conveniently formed in the shape of beads, the size of which can be made to vary in accordance with standard pelletizing equipment.

TABLE 1

EXTRUSION CONDITIONS

|  |  | I | II | III |
|---|---|---|---|---|
| PRECONDITIONING INFORMATION | | | | |
| Preconditioner Speed | rpm | 200 | 200 | 200 |
| Steam Flow to Preconditioner | kg/hr | 0 | 0 | 0 |
| Water Flow to Preconditioner | kg/hr | 16.26 | 16.26 | 16.26 |
| Moisture Entering Extruder | % wt | 31.19 | 31.12 | 30.22 |
| EXTRUSION INFORMATION: | | | | |
| Extruder Shaft Speed | rpm | 100 | 170 | 150 |
| Extruder Motor Load | % | 67 | 45 | 38 |
| Steam Flow to Extruder | kg/hr | 0 | 0 | 0 |
| Water Flow to Extruder | kg/hr | 0 | 0 | 0 |
| Control/Temperature 1$^{st}$ Head | ° C. | | | |
| Control/Temperature 2$^{nd}$ Head | ° C. | 20/16 | 20/19 | 15 |
| Control/Temperature 3$^{rd}$ Head | ° C. | 20/16 | 20/18 | 15 |
| Control/Temperature 4$^{th}$ Head | ° C. | 65/65 | 75/75 | 80/80 |
| Control/Temperature 5$^{th}$ Head | ° C. | 65/65 | 75/75 | 80/80 |
| Control/Temperature 6$^{th}$ Head | ° C. | 65/65 | 75/75 | 80/79 |
| Control/Temperature 7$^{th}$ Head | ° C. | 65/65 | 75/75 | 75/74 |
| Control/Temperature 8$^{th}$ Head | ° C. | 65/65 | 75/75 | 75/74 |
| Control/Temperature 9$^{th}$ Head | ° C. | 65/67 | 75/75 | 70/67 |
| Head/Pressure | kPs | 7/0 | 7/0 | 7/0 |
| Head/Pressure | kPa | 8/5520 | 8/5520 | 8/6210 |
| FINAL PRODUCT INFORMATION: | | | | |
| Extruder Discharge Moisture | % wt | 29.37 | 29.78 | 27.11 |
| Extruder Discharge Rate | kg/hr | 100 | 110 | |
| Extruder Performance | | Stable | Stable | Stable |
| Final Product Description | | Starch Beads | Starch Beads | Starch Beads |

I. Potato starch 93.5% (Redisol brand) with 5% calcium carbonate and 1.5% Blendmax lecithin as processing aid.
II. Potato starch 93.03% with 4.98% calcium carbonate and 1.99% Blendmax lecithin.
III. Potato starch 88.50 with 10.0% calcium carbonate and 1.5% Blendmax lecithin.

TABLE 2

DRYER FORMULA

| FORMULA NUMBER: | | I | II | III |
|---|---|---|---|---|
| Model Number | | | | |
| Number of Sections | | | | |
| Zone 1 Temperature | ° C. | 76.6 | 76.6 | 76.6 |
| Retention Time - Pass 1 | min | 15 | 15 | 15 |
| Retention Time - Pass 2 | min | 45 | 45 | 45 |
| Retention Tie - Cooler | min | 5 | 5 | 5 |
| Exhaust Relative Humidity | % | 40 | 40 | 40 |

TABLE 3

PRODUCT ANALYSIS

| PRODUCT ANALYSIS NUMBER: | | I | II | III |
|---|---|---|---|---|
| Product Moistures | | | | |
| Preconditioner Discharge | % wt | 31.19 | 31.12 | 30.22 |
| Extruder Discharge | % wt | 29.37 | 29.78 | 27.11 |
| Dryer Discharge | % wt | 15.62 | 14.9 | 14.14 |

TABLE 4

EXTRUSION CONDITIONS

|  |  | IV | V |
|---|---|---|---|
| RUN NUMBER: | | | |
| Dry Recipe Information | | | |
| Dry Recipe Density | kg/m$^3$ | 780 | 780 |
| Dry Recipe Rate | kg/hr | 583 | 606 |
| Feed Screw Speed | rpm | 30 | 27 |
| PRECONDITIONING INFORMATION: | | | |
| Preconditioner Speed | rpm | 250 | 250 |
| Steam Flow to Preconditioner | kg/hr | 36 | 36 |
| Water Flow to Preconditioner | kg/hr | 90 | 90 |
| Preconditioner Discharge Temp. | ° C. | 93 | 90 |
| Moisture Entering Extruder | % wt | 22.63 | 25.15 |
| EXTRUSION INFORMATION: | | | |
| Extruder Shaft Speed | Rpm | 228 | 230 |
| Extruder Motor Load | % | 49 | 49 |
| Steam Flow to Extruder | kg/hr | 0 | 0 |
| Water Flow to Extruder | kg/hr | 0 | 0 |
| Control/Temperature 1$^{st}$ Head | ° C. | 38/55 | 38/50 |
| Control/Temperature 2$^{nd}$ Head | ° C. | 70/80 | 77/77 |
| Control/Temperature 3$^{rd}$ Head | ° C. | 80/80 | 86/87 |
| Control/Temperature 4$^{th}$ Head | ° C. | 90/93 | 90/91 |
| Control/Temperature 5$^{th}$ Head | ° C. | 80/77 | 80/79 |
| Head/Pressure | kPs | 4950 | 4280 |
| Knife Drive Speed | rpm | 675 | |

TABLE 4-continued

EXTRUSION CONDITIONS

|  |  | IV | V |
|---|---|---|---|
| FINAL PRODUCT INFORMATION: |  |  |  |
| Extruder Discharge Moisture | % wt | 15.16 | 13.93 |
| Final Product Description |  | Beads | Beads |

IV. Cornflour 91.49% with 7.01% calcium carbonate and 1.5% lecithin
V. Riceflour 91.49% with 7.01% calcium carbonate and 1.5% lecithin

TABLE 5

DRYER FORMULA

| DRYER FORMULA NUMBER: |  | IV | V |
|---|---|---|---|
| Model Number |  |  |  |
| Zone 1 Temperature | ° C. | 92 | 90 |
| Zone 2 Temperature | ° C. | 100 | 100 |
| Retention Time - Pass 1 | min | 13.9 | 13.8 |
| Retention Time - Pass 2 | min | 15.4 | 15.3 |
| Fan Speed 1 | rpm | 1800 | 1800 |
| Fan Speed 2 | rpm | 1815 | 1800 |
| Fan Speed 3 | rpm | 1805 | 1800 |
| Fan Speed 4 | rpm | 1800 | 1800 |

TABLE 6

PRODUCT ANALYSIS

| PRODUCT MOISTURES: |  | IV | V |
|---|---|---|---|
| Preconditioner Discharge | % wt | 22.63 | 25.16 |
| Extruder Discharge | % wt | 15.16 | 13.93 |

Once extruded bead is produced, and as can be seen from the various preferred embodiment identified in the accompanying Tables, the water level of the bead exiting the extruder is less than the water level of the starch/water mixture entering the extruder. In the context of the present invention, it has been appreciated that by starting at the starch/water levels herein, one effectively insures that one will ultimately proceed to injection molding at an adequate water level to provide for a stable melt (non-degrading) and injection mold a quality starch product with improved performance characteristics.

Subsequent to recovery of the starch/water extrudate, optionally, the extrudate may be placed into a dryer at various periods of time (see Tables 2 and 5) wherein the water level of the extrudate is lowered an additional amount depending upon dryer conditions. Preferably, the water level of the starch/water extrudate is lowered within the range of about 15-20%, at which point the extrudate is in condition for injection molding.

In the step of injection molding, preferably, the injection molding technique is similarly configured to reduce moisture content once again, to a final level that is at or below about 20% by weight of the starch material. However, in preferred embodiment, the final level of water in the molded product is between about 5-20% by weight, in a more preferable embodiment the water level of the molded product is set to about 10-15% by weight, and in a most preferred embodiment, the water level of the molded product is set to about 11-14%, or 11-13% by weight. It has been found, therefore, that by sequencing the loss of water, from extrusion, to injection molding, one achieves outstanding quality for the various shaped products produced in accordance with such step-down in moisture levels through-out the melt processing history disclosed herein.

In that regard, it has been uniquely found in accordance with the present invention that it is important to actually cool the initial zone or zones of the injection molding machine proximate the hopper feed section to thereby significantly improve the quality of the injection molded parts produced herein. This is, of course, contrary to conventional injection molding practices, wherein uniform heating above the resin Tm is generally applied to all zones of the injection molding apparatus.

Those skilled in the art will appreciate that an injection molding machine typically contains a hopper feed section, a barrel and an output nozzle, including a plurality of heating zones in the barrel extending from the hopper section to the nozzle. In accordance therefore with the present invention, it has been found preferable to maintain the temperature in the first zone adjacent the hopper at a temperature of less than about 150° F. More preferably, the first zone adjacent the hopper is set in the range of about 45–150° F. In an even more preferred embodiment, i.e., that situation wherein there is a first zone adjacent the hopper, and a second zone adjacent the first zone, the temperatures of the first zone is set to about 45–70° F., and the second zone is set to about 70–150° F. These temperatures are most conveniently achieved by the use of cooling cools placed about the barrel of the injection molding machine, said cooling cools comprising copper cooling cools with circulating water.

In a particularly preferred embodiment, the following temperature profile has been successfully applied to a standard injection molding machine: Zone 4 (closest to hopper)= 45–70° F.; Zone 3=70–150° F.; Zone 2=150–300° F.; Zone 1=275–375° F., Nozzle=275–390° F. In addition, bushing (inside the mold) is preferably set at about 325–425° F. The mold temperature is preferably set at 35–65° F.

The advantage of the above unique temperature profile, is that as opposed to the conventional practice of heating the barrel of the screw to melt the material in the zones proximate the hopper, the barrel is cooled at such regions to prevent the starch material from over-heating and burning. Those skilled in the art will recognize that in the case of preparing a high-quality injection molded starch product, burning has been a pervasive problem. Accordingly, unique to the invention herein, it has been appreciated that such over-heating and burning can be regulated by an injection molding heating zone profile that actually cools the barrel of the injection molding machine, thereby minimize the ability of the starch to thermally degrade.

In accordance with the present invention, other additives can be advantageously combined with the starch/water mixture to further improve the quality or strength characteristics of the molded products ultimately produced. In that regard, and for the purpose of preparing a pet chew toy, it has been found desirable to add attractants such as chicken powder, liver powder, ham, turkey, beef and/or fish in an amount of from about 1.0–5.0% by weight.

For example, once a molded product is prepared in accordance with the present invention, it has also been found that over time, the water may actually migrate out of the starch, thereby making the starch more brittle, which, of course, would be unsuitable in the case of a pet chew toy.

However, by the addition of a humectant, a compound additive which retains water in the material even in the presence of heat, the products herein will remain more ductile over longer periods of time. A particularly preferred humectant is oat fiber, and the levels of such humectant are advantageously in the range of 0.1–5.0%, more preferably, 0.5–3%, and in a most preferred embodiment, 0.5–1.0%.

The various pet chew toys made in accordance with the present invention have been found, for example, to be popular with dogs, by virtue of its chewability and consistency, and improved mechanical properties. As the dog chews on the product, small sections of the product become dislodged, thereby providing the animal with the nutritional benefit of the components contained therein. In accordance therefore with the present invention, additives such as vitamins may be added to the product, either during extrusion or injection molding.

A preferred dog chew of the present invention is prepared from a potato starch product sold under the trademark PARAGON 1010IM by AVEBE, of Veendam. The Netherlands. The PARAGON 1010 IM is sold in the form of thermoplastic granules which can be molded in accordance with the novel injection molding processing conditions disclosed herein, which, as noted above, operates under conditions wherein the zone or zones proximate to the hopper are actually cooled, as opposed to heated. In such preferred formulation, the starch is present at about 70%, the water is at about 15%, along with 5–10% calcium carbonate and 1–5% natural vegetable additive. That calcium carbonate has been found to increase the hardness of the products produced therefrom.

This invention has been set forth in detail, but it should be understood by those skilled in the art that the various example herein are by way of illustration only. Modifications and variation will therefore be apparent and may be resorted to without departing from the spirit and equivalent scope of this invention. Accordingly, such modifications and equivalents are considered to be within the purview of scope of the invention as set forth in the following claims:

What is claimed is:

1. A process for forming starch into a molded article using melt processing techniques which process comprises:
   (a) combining starch and water to form a mixture wherein the water content is in the range of about 20.0 to 40.0% by weight with respect to that of said starch;
   (b) introducing and heating said mixture in a vented barrel extruder to form extruded beads wherein the water content of said beads upon discharge from said extruder is less than the water content of said mixture entering said extruder; and
   (c) introducing the extruded beads of (b) to a heated injection molding machine and injection molding and cooling to form said molded article wherein the water content of said molded article is at or below about 20% by weight.

2. The process of claim 1, wherein the injection molded machine is a vented barrel injection molding machine.

3. The process of claim 1, wherein the injection molding machine contains a vented mold.

4. The process of claim 1, further comprising the step of introducing the product of step (b) to a dryer and reducing the water content to a level less than that of the water content of said product discharged from said extruder.

5. The process of claim 1 wherein said water content in step (a) is about 25–35% by weight.

6. The process of claim 1, wherein said water content in step (a) is about 30–35% by weight.

7. The process of claim 1 wherein said water content in step (a) is about 30–33% by weight.

8. The process of claim 1, wherein the water content of said molded article is about 5–20% by weight.

9. The process of claim 1, wherein the water content of said molded article is about 10–15% by weight.

10. The process of claim 1, wherein the water content of said molded article is about 11–14% by weight.

11. The process of claim 1, wherein the water content of said molded article is about 11–13% by weight.

12. The process of claim 1, wherein the water content in step (a) is about 25–35% by weight, and the water content of said molded article is about 10–15% by weight.

13. The process of claim 1, wherein during step (c), 1–5% of an attractant and 0.1–5% of a humectant are added to said extruded mixture.

14. A process for forming starch into a molded article using melt processing techniques which process comprises:
   (a) combining starch and water to form a mixture wherein the water content is in the range of greater than about 20.0 to 40.0% by weight with respect to that of said starch;
   (b) introducing and heating said mixture in a vented barrel extruder to form extruded beads wherein the water content of said beads upon discharge from said extruder is less than the water content of said mixture entering said extruder; and
   (c) introducing the extruded beads of (b) to a heated injection molding machine and injection molding and cooling to form said molded article wherein the water content of said molded article is at or below about 20% by weight, wherein the injection molding machine contains a hopper feed section, a barrel and an output nozzle, including a plurality of heating zones in said barrel extending from said hopper section to said nozzle, wherein said heating zone in said barrel adjacent said hopper is maintained at a temperature of less than about 150° F.

15. The process of claim 14, further comprising the step of introducing the product of step (b) to a dryer and reducing the water content to a level less than that of the water content of said product discharged from said extruder.

16. The process of claim 14, wherein said barrel adjacent said hopper is maintained at a temperature of less than about 100° F.

17. The process of claim 14 wherein said barrel adjacent said hopper is maintained at a temperature of less than about 75° F.

18. The process of claim 14, wherein said barrel adjacent said hopper is cooled to a temperature of between about 40–80° F.

19. The process of claim 14 wherein said cooling to form said molded product takes place in a mold cooled to about 35–65° F.

20. A process for forming starch into a molded article using melt processing techniques which process comprises:
   (a) combining starch and water to form a mixture wherein the water content is in the range of greater than about 20.0 to 40.0% by weight with respect to that of said starch;
   (b) introducing and heating said mixture in a vented barrel extruder to form extruded beads wherein the water content of said beads upon discharge from said extruder is less than the water content of said mixture entering said extruder; and
   (c) introducing the extruded beads of (b) to a heated injection molding machine and injection molding and cooling to form said molded article wherein the water content of said molded article is at or below about 20% by weight, wherein the injection molding machine contains a hopper feed section, a barrel and an output nozzle, including a plurality of heating zones in said barrel extending from said hopper section to said nozzle, wherein the first and second zones adjacent said hopper are maintained at a temperature less than about 150° F.

21. The process of claim 20, further comprising the step of introducing the product of step (b) to a dryer and reducing the water content to a level less than that of the water content of said product discharged from said extruder.

22. The process of claim 20, wherein during step (c), 1–5% of an attractant and 0.1–5% of a humectant are added to said extruded mixture.

23. A process for forming starch into a molded article using melt processing techniques which process comprises:
  (a) combining starch and water to form a mixture wherein the water content is in the range of greater than about 20.0 to about 40.0% by weight with respect to that of said starch;
  (b) introducing and heating said mixture in a vented barrel extruder to form extruded beads wherein the water content of said beads upon discharge from said extruder is less than the water content of said mixture entering said extruder; and
  (c) introducing the extruded beads of (b) to a heated injection molding machine containing a mold and injection molding and cooling to form said molded article wherein the water content of said molded article is at or below about 20% by weight, wherein the injection molding machine contains a hopper feed section, a barrel and an output nozzle, including a plurality of heating zones in said barrel extending from said hopper section to said nozzle, wherein said plurality of heating zones are set within the following temperature ranges:
  zone 1=at or below about 70° F.
  zone 2=at or below 150° F.
  zone 3=at or below 300° F.
  zone 4=at or below about 375° F.

24. The process of claim 23, further comprising the step of introducing the extruded mixture of step (b) to a dryer and reducing the water content to a level less than that of the water content of said extruded mixture discharged from said extruder.

25. The process of claim 23, wherein said cooling to form said molded article takes place in said mold at a temperature of about 35–65° F.

26. The process of claim 23, wherein said mold contains a bushing heated to about 300–425° F.

27. The process of claim 23, wherein said nozzle is maintained at a temperature between about 275–390° F.

28. The process of claim 23, wherein during step (c), 1–5% of an attractant and 0.1–5% of a humectant are added to said extruded mixture.

29. In the process of manufacturing a molded starch/water product, the improvement which comprises forming extruded starch pellets via a vented barrel extruder containing water therein and introducing those pellets to a heated injection molding machine and injection molding and cooling to form a molded article wherein the water content of said molded article is at or below about 20% by weight, wherein the injection molding machine contains a hopper feed section, a barrel and an output nozzle, including a plurality of heating zones in said barrel extending from said hopper section to said nozzle, wherein the zone adjacent said hopper is maintained at a temperature less than about 150° F.

30. The process of claim 29, wherein said zone adjacent said hopper is maintained at a temperature between 45–150° F.

31. The process of claim 29 wherein said zone adjacent said hopper comprises a first heating zone adjacent said hopper, and a second heating zone adjacent said first zone, and the temperatures of said first heating zone is about 45–70 ° F. and the temperature of said second heating zone is about 70–150° F.

32. The process of claim 29 wherein during said injection molding 1–5% of an attractant and 0.1–5% of a humectant are added to said extruded mixture.

33. An injection molded starch product formed by:
  (a) combining starch and water to form a mixture wherein the water content is in the range of about 20.0 to 40.0% by weight with respect to that of said starch;
  (b) introducing and heating said mixture in a vented barrel extruder to form extruded beads wherein the water content of said beads upon discharge from said extruder is less than the water content of said mixture entering said extruder; and
  (c) introducing the extruded beads of (b) to a heated injection molding machine and injection molding and cooling to form said molded starch product wherein the water content of said molded article is at or below about 20% by weight.

34. The product of claim 33, further comprising the step of introducing the extruded mixture of step (b) to a dryer and reducing the water content to a level less than that of the water content of said extruded mixture discharged from said extruder.

35. The product of claim 34 wherein during step (c), 1–5% of an attractant and 0.1–5% of a humectant are added to said extruded mixture.

* * * * *